Jan. 11, 1966    R. SCHUMACHER ETAL    3,229,111
A.C. POWER SYSTEM HAVING ALTERNATE SOURCES OF SUPPLY
Filed Oct. 27, 1961    4 Sheets-Sheet 3

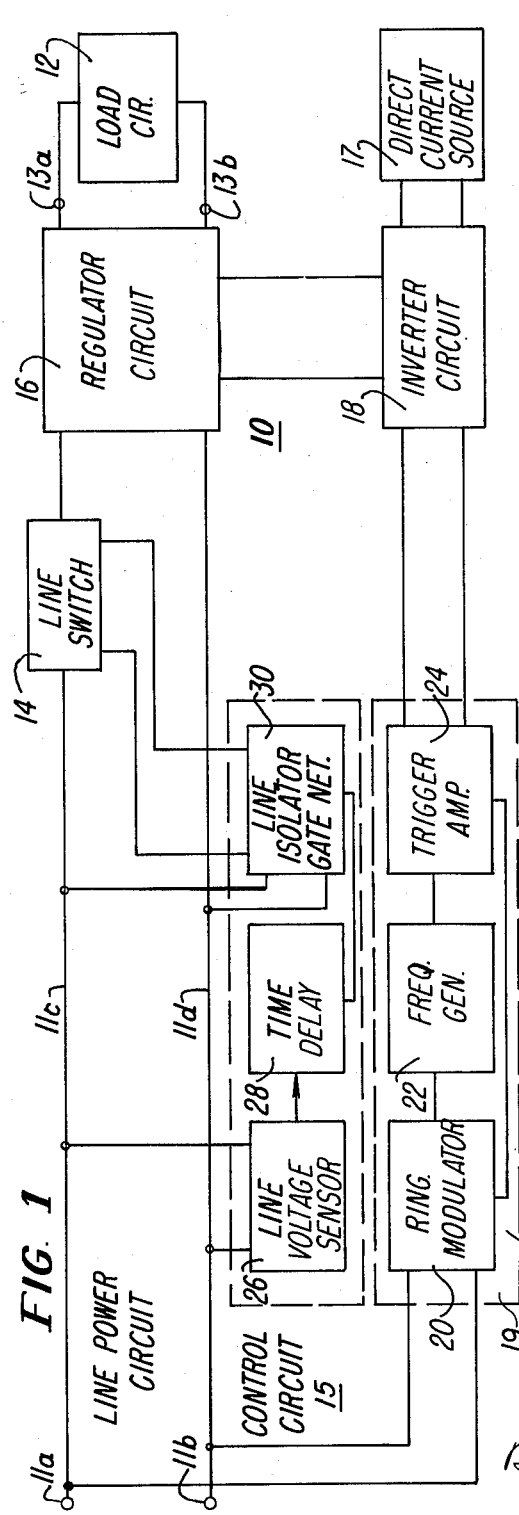
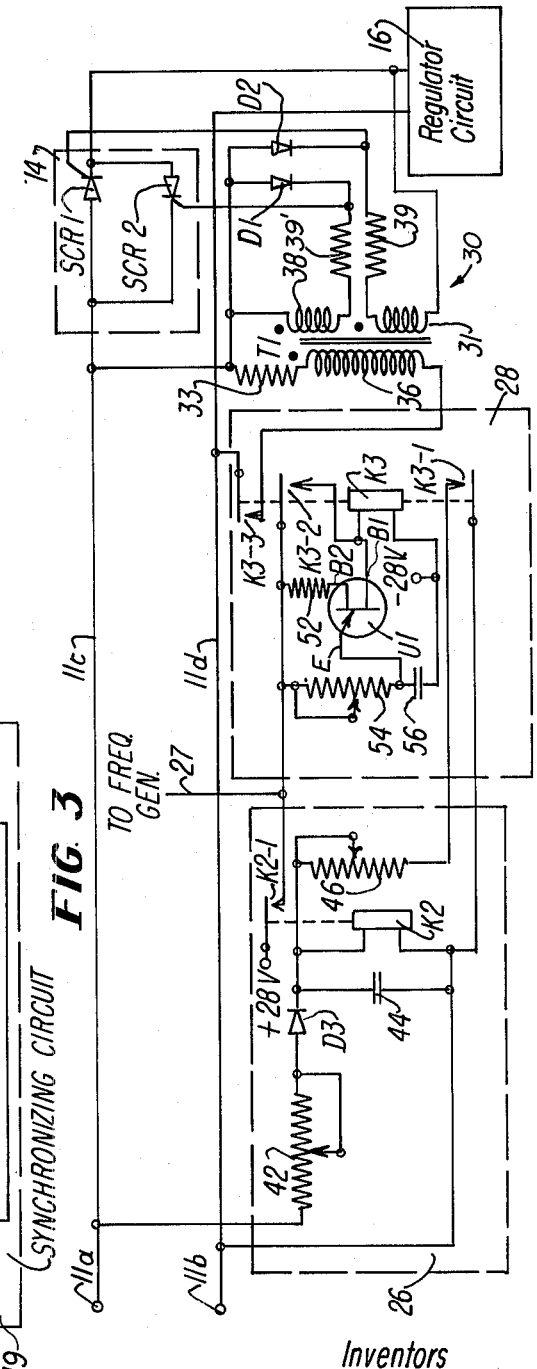

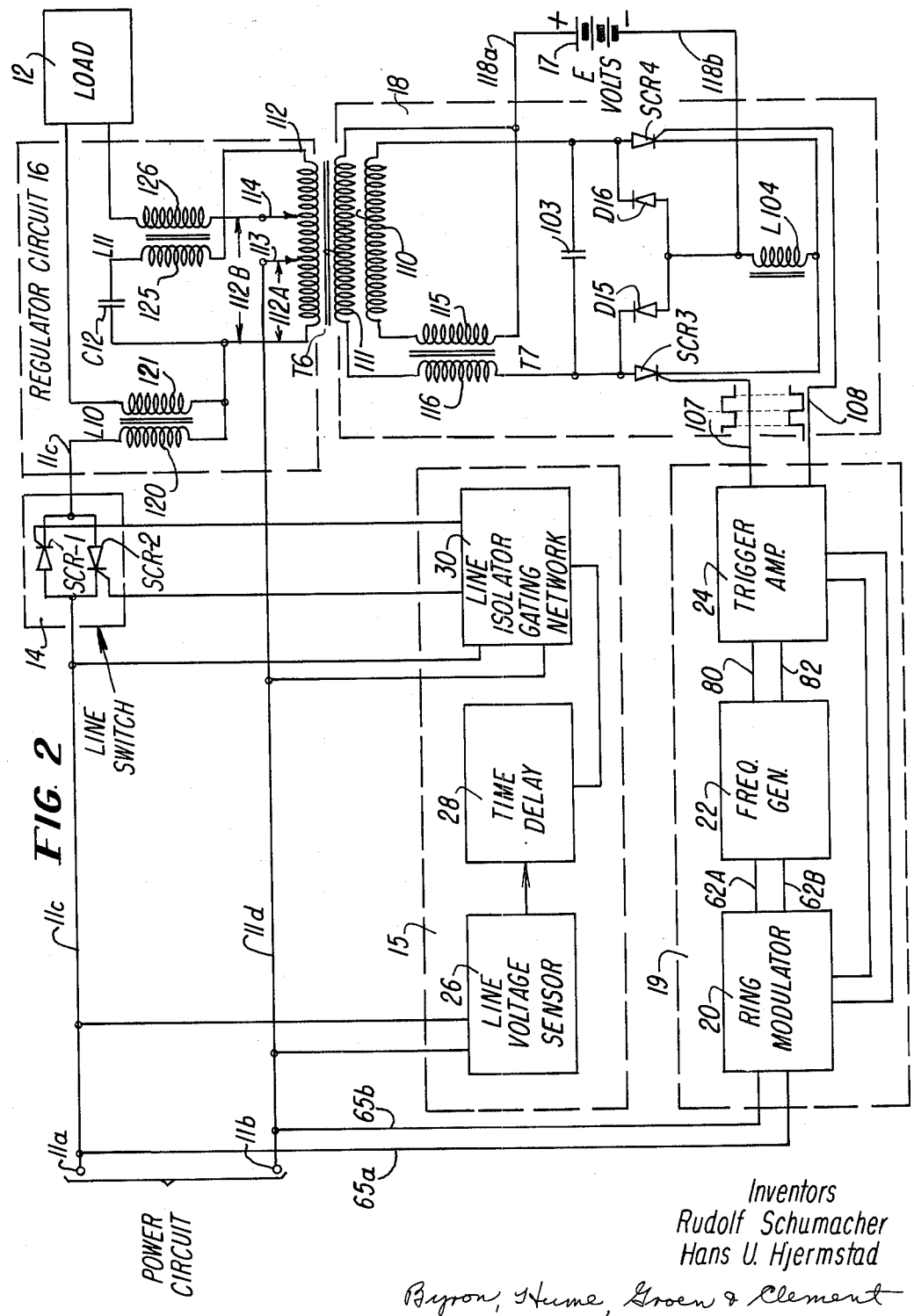

INVENTORS
Rudolf Schumacher
Hans U. Hjermstad
BY
Byron, Hume, Groen & Clement
Attys.

Jan. 11, 1966    R. SCHUMACHER ETAL    3,229,111
A.C. POWER SYSTEM HAVING ALTERNATE SOURCES OF SUPPLY
Filed Oct. 27, 1961    4 Sheets-Sheet 4

Inventors
Rudolf Schumacher
Hans U. Hjermstad

Byron, Hume, Groen & Clement
Attys.

United States Patent Office 3,229,111
Patented Jan. 11, 1966

3,229,111
A.C. POWER SYSTEM HAVING ALTERNATE SOURCES OF SUPPLY
Rudolf Schumacher, Wood Dale, and Hans U. Hjermstad, Chicago, Ill., assignors to Electro-Seal Corporation, Des Plaines, Ill., a corporation of Illinois
Filed Oct. 27, 1961, Ser. No. 148,227
13 Claims. (Cl. 307—64)

The present invention relates to an alternating current power distribution system and in particular to an alternating current power distribution circuit supplied alternatively from a line alternating current power source and from a standby direct current power source.

A general object of the present invention is to provide an alternating current power distribution circuit of solid state elements capable of continuously providing regulated alternating current power to a load independent of line power continuity.

A further object of the invention is to provide an improved alternating current power distribution circuit supplying amplitude regulated sine wave alternating current power normally from a line power source but alternatively from a direct current power source.

It is another object of this invention to provide an alternating current power distribution circuit adapted for use with a line power source and which includes a direct current power source and inverter that picks up the load with zero switch-over time whenever the line power source fails.

It is another object of this invention to provide an alternating current power distribution circuit adapted for use with a line power source and a direct current power source and which includes a regulator circuit for continuously providing a substantially distortionless sine wave output voltage of a tightly regulated amplitude regardless of whether power is being supplied from said line power source or storage battery source.

It is another object of the invention to provide an alternating current power distribution circuit adapted for use with a line power source and a direct current power source and including a regulator circuit normally providing output power from said line power source and including a switching circuit responsive to line power failure for effecting instantaneous switch-over to the direct current power source with a transient effect of less than a 10% change in output voltage for an interval of not more than one cycle.

It is another object of the invention to provide an alternating circuit power distribution circuit adapted for use with a line power source and a direct current power source and including a switching circuit. The switching circuit switches out the line power source upon line power failure and switches in the line power source only when line power has reached a predetermined minimum amplitude and only after the circuit output frequency and the line power frequency are at a predetermined phase relationship.

It is another object of the invention to provide an alternating current power distribution circuit adapted for use with a line power source and a direct current power source and including a regulator circuit to which both sources normally supply power and wherein the regulator circuit extracts power from the D.C. source only when the line power source fails.

It is another object of the invention to provide an alternating current power distribution circuit adapted for use with a line power source and which includes a direct current power source and an inverter circuit continuously generating an alternating current wave form that is locked in at a predetermined phase relationship with the line power voltage wave form and wherein as long as the line voltage does not fall below a predetermined value, the load does not draw any current from the D.C. source and inverter circuit.

A further object of the invention is to provide a new and improved regulator circuit for use with alternating current voltages and adapted to provide an amplitude regulated output voltage of sine wave form from either an alternating current square wave voltage or an alternating current sine wave voltage applied thereto.

It is another object of the invention to provide a regulator circuit including a saturable reactor, a capacitance in parallel therewith for forming a ferroresonant circuit which reacts in conjunction with a linear inductance in the input to regulate the input wave and a filtering inductor in series with the capacitance for blocking from the output any frequencies other than the fundamental alternating current line frequency.

A further object of the invention is to provide a new and improved synchronizing circuit adapted to provide signals at a frequency equal to that of a standard and at a phase relationship fixed relative to the standard. Such synchronizing circuit includes a free running oscillator provided with a biasing circuit and includes a detector for matching the phases of the oscillator signals and the standard to produce a corresponding error potential which is applied to the biasing circuit for compensating for any phase difference.

A further object of the invention is to provide a new and improved synchronizing circuit adapted to provide signals at a frequency equal to that of a standard and at a fixed phase relation relative to the standard and including an oscillator provided with a fixed biasing circuit and a charging circuit selectively operative in a first charging condition and in a second charging condition, and including a detector for producing an error potential corresponding to any phase difference between the output of the oscillator and the signals of the standard so that with the oscillator in a first charging condition the phase of the output signals are coincident with the phase of the standard and with the oscillator in a second charging condition a constant error is introduced into the oscillator and phase detector whereby the oscillator provides output pulses at the frequency of the standard but at a phase different from the standard.

Briefly, the present invention contemplates an alternating current power distribution circuit including a regulator circuit provided with alternating current power derived from a line power source and also provided with alternating current power derived from a direct current power source, e.g. as a storage battery. The regulator circuit acts to provide an amplitude regulated output voltage of a sine wave form regardless of the source from which the power is derived. A switching circuit is adapted to supply alternating current voltage from the line power source only when its voltage is above a predetermined voltage. In other circumstances the switching circuit operates to completely disconnect the line power source from the regulator circuit. An inverter generates an alternating current wave form from the direct current power source and supplies that power to the regulator circuit. In the presence of an alternating current line voltage above the predetermined voltage, a synchronizing circuit acts to adjust the phase of the alternating current from the inverter circuit to lagging that wave form provided from the line power source. In this circumstance, the regulator circuit draws its power from the line power source. In the event of line power failure, the switching circuit acts to disconnect the line power source from the regulator circuit so that the load thereof is imposed directly upon the inverter circuit and the direct current source. If thereafter the line power source is reinstated and the voltage amplitude thereof is greater than the predetermined voltage, the switching circuit operates to reconnect the line power source to the regulator circuit but only after the synchronizing circuit has again adjusted the phase of the alternating current wave from the inverter circuit to lagging that of the wave provided from the line power source.

The invention, both as to its organization and method of operation, together with further objects and advantages thereof, will be best understood by reference to the following description taken in conjunction with the accompanying drawings, forming a part thereof, in which:

FIGURE 1 is a block schematic representation of the alternating power distribution circuit in accordance with the invention;

FIGURE 2 is a representation similar to that of FIGURE 1 but displaying the inverter circuit and the regulator circuit in circuit schematic form;

FIGURE 3 is a detailed circuit schematic representation of the line switch and the control circuit therefor shown in block form in FIGURE 1, including in detail the circuit arrangement of the line voltage sensor, the time delay and the line isolator gating network;

Figure 4:
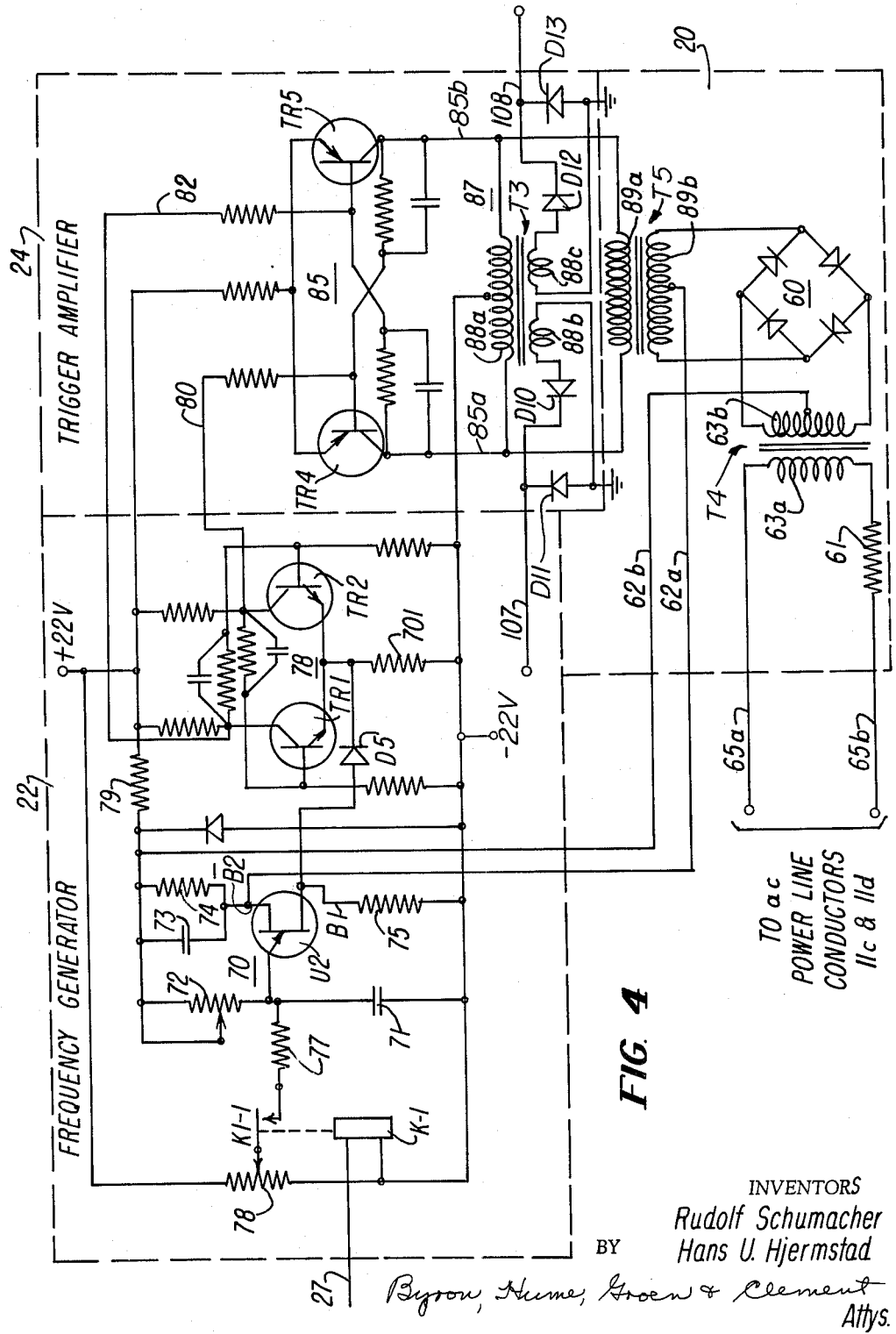
FIGURE 4 is a circuit schematic representation of the synchronizing circuit portion of the arrangement shown in FIGURE 1, including in detail the circuit arrangement of the ring modulator, the frequency generator and the trigger amplifiers.

Referring to the drawings, there is shown in FIGURE 1, in block schematic form, the alternating current power distribution circuit 10 in accordance with the invention. In this arrangement, a load 12 is fed regulated power through a regulator circuit 16 drawing power alternately from a line power source connected to the terminals 11a and 11b and from an inverter circuit 18 supplied from a direct current source 17. Interrupting the line power conductors 11c and 11d between the terminals 11a and 11b and the regulator circuit 16 is a line switch 14, the operation of which is controlled through a control circuit 15 including line voltage sensor 26, a time delay circuit 28, and a line isolator gating network 30. Directing the operation of the inverter circuit 18 is a synchronizing circuit 19 including therein a ring modulator 20, a frequency generator 22, and a trigger amplifier 24.

The load circuit 12 may be any form of electrical device to which it is desired to continuously supply power even in the circumstance of power line failures. The regulator circuit 16 operates on the alternating current power provided thereto from the line power conductors 11c and 11d or the inverter circuit 18 to insure an output sine wave of low harmonic distortion and of regulated amplitude. The inverter circuit 18 functions to convert power from the direct current power source 17 into alternating current power of a 60 cycle frequency. The synchronizing circuit 19 functions to control the frequency of the alternating current power provided from the inverter circuit 18 and to synchronize operation of the inverter circuit relative to the alternating current line voltage wave form on the line conductors 11c and 11d so as to maintain a predetermined phase relationship between the alternating current line voltage and the alternating current power provided from the inverter circuit.

In the control circuit 15, the line voltage sensor 26 and the time delay circuit 28 operate upon the line isolator gating network 30 to control the gating operation of the latter in accordance with the amplitude of the voltage appearing at the lines 11c and 11d. The line isolator gating network 30 functions finally to provide gating signals to the line switch 14 which is normally supplying power to the regulating circuit 16. Upon failure of the line isolator gating network to provide gating signals (e.g. in response to a line power failure), the line switch 14 is effectively opened so that the flow of power to the regulator circuit is interrupted.

The various elements of the alternating current power circuit 10 and their function will be better understood by giving consideration first to the structure of the individual elements themselves.

*Line switching operation*

The line switching operation is carried out at the line switch 14 by virtue of the operation of the control circuit 15. As shown in FIGURE 3, the line switch 14 comprises a pair of silicon controlled rectifiers SCR1 and SCR2 through which current in the line conductors 11c and 11d flows in a loop path through the regulator circuit 16. The function of the line switch is to permit current flow through the line conductors 11c and 11d to the regulator circuit 16 only under positive gating control provided from the line conductors themselves thereby to make certain that in the event of power line failure power is not delivered from the regulator circuit back into the power line.

A silicon controlled rectifier is a three electrode semiconductor device which may be utilized in power control and power switching applications. It includes an anode terminal, a cathode terminal, and a gating terminal and is responsive to a positive anode-cathode voltage and the application of a positive gating signal to the gate terminal to complete a low impedance connection. In the absence of either the positive gating signal or the positive anode-cathode voltage, the silicon controlled rectifier cannot be rendered conductive and if conductive the silicon controlled rectifier is rendered non-conductive when the anode-cathode voltage goes to zero or becomes negative.

Under normal operating conditions the rectifier SCR1 has a positive anode-cathode voltage and is gated from the line isolator gating network 30 during the first half cycle of each sine wave cycle on the line conductors 11c and 11d and the silicon controlled rectifier SCR2 has a positive anode-cathode voltage and a gating signal applied to its gating terminal during the second or alternate half cycle of each sine wave cycle on the line conductors 11c and 11d.

Gating signals are generated in the line isolator gating network 30 shown in FIGURE 3 through the operation of the transformer T1 and the diodes D1 and D2. The primary winding 36 of the transformer T1 is connected across the alternating current line 11c and 11d via a resistor 33 and the normally open contacts K3–3, the latter of which is included in the time delay circuit 28 as considered hereinafter. Assuming that the contacts K3–3 are closed so as to energize the primary winding 36 of the transformer T1, the secondary winding 31 functions so as to create a positive gating signal for the gate terminal of the rectifier SCR1 during the first half cycle of the sine wave form on the line conductors and the secondary winding 38 functions so as to provide a positive gating signal to the gate terminal of the rectifier SCR2 during the second half cycle of the sine wave form on the line conductors 11c and 11d.

Specifically, during each first half cycle of the alternating current power a current flow is induced in the secondary winding 31 in a path including the diode D2 and a load resistor 39. During this interval the signal generated at the junction between the resistor 39 and the diode D2 is applied to the gating terminal of the rectifier SCR1 thereby providing a positive gating signal. During each subsequent or second half cycle nothing takes place within the circuit connected with the secondary winding 31 because the diode D2 therein blocks conduction.

Similarly, during each second half cycle of the alternating current power a circuit is completed through the secondary winding 38 via the diode D1 and the load resistor 39′ whereby the signal generated at the junction between the resistor 39' and the diode D1 is applied to the gating terminal of the silicon controlled rectifier SCR2 thereby providing a positive gating signal. During each subsequent or first half cycle nothing takes place in the circuit including the secondary winding 38 because the diode D1 blocks any conduction therein.

Accordingly, during first half cycles of the alternating current power on the conductors 11c and 11d, silicon controlled rectifier SCR1 is biased positive from its anode to its cathode and the gate terminal has applied thereto a positive gating signal whereby the rectifier SCR1 is rendered conductive. During second half cycles of the alternating current power the silicon controlled rectifier SCR2 is biased positive from its anode to its cathode and its gate terminal has applied thereto a positive gating signal whereby the rectifier SCR2 is rendered conductive. If for any reason the line isolator gating network 30 is not operative, obviously gating signals will not be applied to the silicon controlled rectifiers SCR1 and SCR2 so that the line switch 14 will be effectively open thereby interrupting the transmission of power in either direction via the conductors 11c and 11d. The function of interrupting operation of the line isolator gating circuit is carried out by means of the line voltage sensor 26 and the time delay circuit 28.

The line voltage sensor 26 and the time delay circuit 28 are responsive to the amplitude of the alternating current voltage on the conductors 11c and 11d. When the line voltage falls below a predetermined "dropout" voltage level, the line voltage sensor is actuated and operates through the time delay circuit 28 to immediately interrupt operation of the line isolator gating network 30 thereby opening the line switch 14.

The line voltage sensor is also responsive to a predetermined "pull-in" voltage. In a circumstance where the line voltage sensor is restored responsive to the line voltage falling below a predetermined dropout level, the subsequent increase of the line voltage on the conductors 11c and 11d up to the predetermined pull-in level will actuate the voltage sensor circuit 26 and energize the time delay circuit 28. After an appropriate time delay, the line isolator gating network 30 is reactivated for presenting gating signals to the line switch 14. The function of the time delay circuit 28 is to maintain the line switch 14 open for a minimum period of time once the line voltage does fall below the dropout level, thereby to protect the entire alternating current power circuit from the effect of transient line voltage surges that oftentimes appear on the power lines in the circumstances of a line failure. These transient surges if applied through the regulator 16 would have the effect of introducing undesired transients into the load circuit 12.

The line voltage sensor circuit 26 as shown in FIG. 3 is connected to the line conductors 11c and 11d and includes variable resistors 42 and 46, a diode D3, a capacitor 44 and a relay K2. The alternating current line input is applied through the variable resistor 42 and the diode D3 to the parallel combination of capacitor 44 and winding of relay K2. When the amplitude of the alternating current input reaches an amplitude sufficient to charge the capacitor 44 to the predetermined pull-in voltage, the relay K2 is energized and closes the contacts K2–1 thereby closing the circuit for applying positive battery potential to the time delay circuit 28. The value of the capacitor 44 is fixed but the particular pull-in voltage level to which the line sensor voltage is adjusted is determined by the setting of the variable resistor 42.

The time delay circuit 28 comprises a unijunction transistor U1, a relay K3, a load resistor 52, a variable resistor 54, and a charging capacitor 56. The unijunction transistor U1 comprises two ohmic contacts B2 and B1 and an emitter contact E. Whenever the voltage on the emitter is less than the selected peak point voltage between the ohmic contacts B1 and B2, the unijunction is substantially non-conducting. However, when the voltage at the emitter E is greater than the selected peak point voltage between the ohmic contacts B1 and B2, the unijunction is rendered conductive between the emitter and the base contact B1 causing conduction between the ohmic contacts B1 and B2.

In the arrangement shown in FIGURE 3, closing of the contacts K2–1 associated with the relay K2, completes a path from battery via the resistor 52, the base electrodes B2 and B1 of the unijunction U1 and the winding of the relay K3. Additionally, a current flow is experienced from battery via the variable resistor 54 to the charging capacitor 56. This current flow is very slow and proceeds slowly until the capacitor 56 charges to the selected peak voltage of the unijunction U1 thereby rendering the unijunction conductive in the emitter-base B1 path whereupon the circuit becomes conductive via the emitter-base B1 path of the unijunction U1 and the winding of the relay K3 to minus 28 volts. Thereupon the relay operates to close the contacts K3–1, K3–2 and K3–3. The time delay inserted by the circuit 28 is determined by the setting of the variable resistor 54 and valve of capacitor 56.

Closure of the contacts K3–1 completes a circuit for the line voltage sensor circuit 26 through the variable resistance 46 in parallel with the winding of the relay K2. The resistor 46 in conjunction with the resistor 42 provides a voltage divider across the line conductors 11c and 11d and when properly adjusted so that the voltage drop across the resistor 46 is at least above the selected "dropout" voltage level for operating relay K2, any diminishment in the line voltage will cause a corresponding diminishment in the voltage drop across the resistor 46 to below the dropout voltage of the relay K2 thereby permitting the latter to become de-energized.

Further, closure of the contacts K3–2 completes a bypass around the resistor 52 and the base contacts B1 and B2 of the unijunction U1 for maintaining the relay K3 operated through the contacts K2–1 of the relay K2. Closure of the contacts K3–3 completes the circuit through the primary winding 36 of the transformer T1 in the line isolator gating network 30, previously referred to.

Thus, in the arrangement of FIGURE 3, and assuming that all of the circuitry disclosed therein is operative and that amplitude of voltage on the conductors 11c and 11d is above the "dropout" voltage, the relay K2 is operated and the contacts K2–1 are closed, the relay K3 is operated and the contacts K3–1, K3–2 and K3–3 are closed, and the line isolator gating network is operated, whereby gating signals are applied to the silicon controlled rectifiers SCR1 and SCR2 in the line switch 14 so that the line power on the line conductors 11c and 11d is transmitted through the line switch 14 to the regulator circuit 16. If thereafter the amplitude of the alternating current voltage on the conductors 11c and 11d should drop below dropout voltage determined by the setting of the variable resistance 46, the relay K2 will become de-energized, thereby interrupting at the contacts K2–1, the operating circuit for the relay K3 whereupon the latter becomes de-energized and interrupts operation of the line isolator gating network 30 and terminates the generation of gating signals therein. Accordingly, the SCR1 and the SCR2 cease conduction upon first zero crossing of the line voltage so that line switch circuit 14 is deactivated and the circuit completed through the conductors 11c and 11d is interrupted.

Thereafter, any increase in the line voltage to the level of the "pull-in" voltage, as determined by the setting of the resistor 42, will cause the relay K2 to operate whereupon the contacts K2–1 will be closed and the time delay circuit 28 will be energized towards the operation of the relay K3. After an appropriate time delay determined by the setting of the variable resistor 54, the relay K3 will be operated in a manner previously explained so as to close contacts K3–1 and prepare for the restoration of the relay K2, complete at contacts K3–2 a circuit for maintaining itself operated and complete at contacts K3–3 circuit for operating the line isolator gating network 30. Immediately thereafter the silicon controlled rectifiers SCR1 and SCR2 in the line switch circuit 14 which already have conduction potentials applied to the anodes and cathodes thereof, will have provided thereto gating signals and the latter will be rendered operative for supplying the alternating current power from the conductors 11c and 11d to the regulating circuit 16.

Synchronizing circuit

As previously pointed out, the synchronizing circuit 19 functions to control the frequency of the alternating current power provided from the inverter circuit 18 and to control operation of the inverter circuit in a manner so as to maintain a predetermined phase relationship between the alternating current wave form provided thereby and the alternating current wave form appearing on the line conductors 11c and 11d. As best shown in FIGURE 4, the synchronizing circuit 19 comprises the frequency generator 22, the trigger amplifier 24 and the ring modulator operating at a frequency of 120 cycles per second (two times the alternating current power line frequency). The output of the frequency generator 22 is applied to the trigger amplifier 24 wherein 60 cycle triggering pulses are generated and applied to the inverter circuit 18 for producing an alternating current wave form therein. The ring modulator 20 is connected across the alternating current power line 11c and 11d via the conductors 65a and 65b. Additionally, the ring modulator is fed the 60 cycle square wave output from the trigger amplifier 24 via the conductors 85a and 85b. In the ring modulator 20 the phases of the alternating current wave forms applied thereto are compared for the purpose of generating an error signal corresponding to any phase difference, which signal is fed to the frequency generator 22 via the conductors 62a and 62b for regulating the operation thereof.

The frequency generator 22, as shown in FIGURE 4, is made up essentially of a relaxation oscillator 70 including the unijunction transistor U2, and a bi-stable multivibrator 78 including the transistors TR1 and TR2. Associated specifically with the relaxation oscillator is a charging capacitor 71 and a variable resistor 72 which are designed to control the potential on the emitter electrode of the unijunction U2. Associated with the base B2 of the unijunction U2 are a parallelly connected capacitor 73 and resistor 74 and associated with the base B1 of the unijunction is a load resistor 75 and a blocking diode D5. Further, there is included in the circuit a relay K1 operative in accordance with the operation of the relay K2 in the voltage sensor circuit 26, which relay K1 includes a contact K1–1 for inserting into the relaxation oscillator circuit a bias from a variable resistor 78 through a fixed resistor 77. The relaxation oscillator will operate regardless of whether or not the contacts K1–1 are opened or closed.

Considering the operation of the relaxation oscillator, timing control is furnished from the capacitor 71 and the variable resistor 72. In the initial state, the capacitor 71 is discharged so that the unijunction U2 is non-conductive in its emitter-base B1 path. As the capacitor charges through the resistor 72, the emitter voltage increases until the emitter voltage is at least equal to the selected peak voltage of the unijunction U2. Thereupon the unijunction U2 is rendered conductive in the emitter-base B1 path and the capacitor 71 is discharged in that path through the resistor 75 thereby producing a pulse which is transmitted via the diode D5 to the bi-stable multivibrator circuit 78. As soon as the timing capacitor 71 is discharged the unijunction U2 is rendered non-conductive and the cycle begins again. The path, including the variable resistor 78, the contacts K1–1 and the resistor 77, provides a parallel path with the resistor 72 for increasing or decreasing the current flow to the capacitor 71. Accordingly, the charging rate of the capacitor 71 can be influenced through this alternative path. This feature is effective as explained hereinafter for the purposes of adjusting the phase of the signal provided by the relaxation oscillator relative to the phase of the alternating current power line signal.

The trigger amplifier 24 includes essentially a contransistors TR1 and TR2 is a conventional NPN type construction wherein the emitter electrodes of the transistors TR1 and TR2 are pulsed between their operative and inoperative state by triggering pulses furnished through the diode D5. The output thereof appears on the conductors 80 and 82 and are supplied to the trigger amplifier 24. The signal on the conductors 80 and 82 are both substantially square wave signals of a 60 cycle frequency and 180 degrees out of phase relative to one another.

The trigger amplifier 25 includes essentially a conventional type PNP transistor bi-stable multivibrator 85 including the transistors TR4 and TR5, and a transformer coupled output network 87 for providing signals to the inverter circuit 18 and also to the ring modulator circuit 20.

In the bi-stable multivibrator 85, accurate phased switching between conductive and non-conductive states is achieved at the transistors TR4 and TR5 by pulsing with the square wave signals appearing on the conductors 80 and 82. Specifically, the transistor TR4 is pulsed between its conductive and non-conductive states by virtue of the effect of the square wave signal on the conductor 80, and the transistor TR5 is operated between its conductive and non-conductive states by virtue of the square wave signal on the conductor 82. Thus, the two transistors TR4 and TR5 operate in perfect synchronism between their on and off states. The output from this bi-stable multivibrator is developed on at the collector electrodes of the transistors TR4 and TR5 and is fed to the transformer coupling network 87.

The transformer coupling network 87 includes a transformer T3 and a transformer T5, each including a primary winding 88a and 89a, respectively, which are connected in parallel across the collector electrodes of the transistors TR4 and TR5. Accordingly, a 60 cycle square wave pulse appears across these primary windings.

In the transformer T3 the primary winding 88a is center tapped to battery potential and there are provided two secondary windings 88b and 88c. The secondary winding 88b is connected to a circuit from common zero potential and including the diodes D10 and D11 whereby there appears at the output conductor 107 a positive going square wave pulse of a 60 cycle frequency. By the same token, the secondary winding 88c is connected in a circuit from ground potential and including the diodes D12 and D13 so as to provide to the conductor 108 positive going square wave pulse of a 60 cycle frequency. The two square wave pulses appearing at the conductors 107 and 108 are each of a 50% duty cycle and are 180 degrees out of phase relative to one another.

The transformer T5 is actually a part of the ring modulator circuit 20 and the primary winding 89a has associated therewith a center tapped secondary winding 89b. In addition to the transformer T5, the ring modulator circuit 20 includes a transformer T4 and a rectifier ring 60. The transformer T4 includes a primary winding 63a which is connected via a resistor 61 to the conductors 65a and 65b extending to the power line conductors 11c and 11d. The secondary winding 63b of the transformer T4 is connected at its end terminals to a pair of inputs of the rectifier ring 60 and the secondary winding 89b of the transformer T5 is connected at its input terminals to the other pair of input terminals of the bridge ring 60.

The secondary winding 63b of the transformer T4 is center tapped and connected via the conductor 62b to the frequency generator and the secondary winding 89b of the transformer T5 is center tapped and connected via the conductor 62a to the frequency generator 22. In the frequency generator the two conductors 62a and 62b are connected across the load resistor 74 connected in the B2 base circuit of the uni-junction U2.

The magnitude and the polarity of the potential between the conductors 62b and 62a is reflective of the phase difference between the voltages on the secondary 63b and 89b and the leading or lagging nature of the phase difference. Specifically, when there is no phase difference between the signals on the secondary windings, there is no potential between the conductors 62a and 62b. However, should the alternating voltage on the secondary winding 89b lag the alternating voltage on the secondary winding 63b, then the polarity on the conductor 62a will be negative with respect to that on 62b by an amount depending upon the phase difference between the two alternating current voltages. In this fashion, the potential at the base electrodes B2 and B1 of the uni-junction U2 will be reduced so that the uni-junction will tend to fire at an earlier time causing the trigger amplifier 24 to fire at an earlier time. Thereby the signal on the secondary winding 89b will be moved back into phase with the signal on the secondary winding 63b. Similarly, should the signal on the secondary winding 89b lead the signal on the secondary winding 63b, then the conductor 62a will be at a positive potential relative to the conductor 62b thereby tending to increase the potential at the base contacts B2 and B1 of the uni-junction U2 and causing the uni-junction U2 to fire at a later time. Accordingly, the trigger amplifier 24 will be triggered at a later time so that the signal on the secondary winding 89b, which was leading, will now be moved back up into phase with the signal on the secondary winding 63b.

In this manner the ring modulator 20 monitors the phase of the voltage on the alternating current power line and also the phase of the signal provided by the trigger amplifier 24 and sends a correction signal to the frequency generator for adjusting the phase of the output from the trigger amplifier 24 to match the phase of the alternating current voltage in the power line conductors 11c and 11d.

In actual practice, the synchronizing circuit 19 functions in a manner so as to maintain a slight phase difference between the alternating current voltage on the power line conductors 11c and 11d and in the output of the trigger amplifier 24. This is all for a purpose as will be described more completely hereinafter and for the present purposes, it is only necessary to understand that when the voltage on the alternating current power lines 11c and 11d is at full amplitude and supplying power to the load, it is preferred that the trigger amplifier signal should lag the alternating current voltage by approximately 10 degrees in phase. This is effected in the frequency generator by provision of the variable resistor 78, the relay K1 and the resistor 77. As pointed out earlier, these resistors, when the contacts K1-1 are closed, provide a parallel charging path for the capacitor 71. The contact K1-1 is closed only when the voltage sensor circuit 26 is operated with its relay K2 pulled in and this occurs when the alternating current power line voltage is at its selected operative level. In this circumstance, the resistor 77 and at least a portion of the resistor 78 act so as to bleed some of the charging current from the capacitor 71 and increase the charging interval for the capacitor 71. This tends to slow down the operation of the frequency generator from 120 cycles per second to, for example, 110 cycles per second, so that the output of the trigger amplifier 24 would tend to decrease in frequency.

Now assuming that the alternating current voltage at the secondary winding 89b of the ring modulator 20 has been in phase with the alternating current voltage at secondary winding 63b prior to the closure of the relay K1 there would have been no error signal to the uni-junction U2. However, due to the slowing up in the operation of the trigger amplifier 24 the phase of the voltage on the secondary winding 89b will tend to lag the phase of that voltage on the winding 63b. In this circumstance then the conductor 62a will assume a negative potential with regard to that on the conductor 62b of an amplitude corresponding to the phase difference so that the uni-junction U2 will be operated to increase the frequency of its output signal. Thus, the circuit path including the resistor 77, the contacts K1-1 and the variable resistor 78 will attempt to slow down the frequency of the frequency generator 22, whereas the ring modulator 20 at the load resistor 74 will attempt to speed the frequency of the frequency generator 22. These two opposing forces will balance at some point in between so as to establish a fixed lagging phase between alternating current voltage on the secondary winding 89b and the alternating current voltage on the secondary winding 63b of the ring modulator 20. Accordingly, the pulses furnished on the conductors 107 and 108 to the inverter circuit 18 will cause the alternating current voltage supplied thereby to lag in phase the alternating current voltage on the power line conductors 11c and 11d.

*Inverter circuit*

The inverter circuit 18 is best illustrated in FIGURE 2. This circuit is essentially a control inverter circuit utilized for the purpose of converting D.C. power from the source 17 to A.C. power for application to the regulator circuit 16. The circuit comprises essentially a pair of silicon controlled rectifiers SCR3 and SCR4 coupled by means of a commutating capacitor C103 and connected to cross certain windings of a pair of transformers T6 and T7. Further, there is included in this circuit inductor L104 for limiting current flow during switching functions.

Silicon controlled rectifiers SCR3 and SCR4 are pulsed from the conductors 107 and 108, respectively, extending from the trigger amplifier 24. The transformer T6 includes the windings 110, 111 and 112 and the transformer T7 includes the windings 115 and 116. The windings of the transformers T6 and T7 are connected across the capacitor C103 in a path including windings 110, 115, 111 and 116 with the junction between the windings 115 and 111 being tapped to the conductor 118a extending to the positive terminal of the direct current source 17. Additionally, there is included in the circuit a pair of diodes D15 and D16 which are connected, respectively, between the terminals of the commutating capacitor 103 and the conductor 118b extending to the negative terminal of the source 17. Assuming that the trigger amplifier 24 is providing over the conductors 107 and 108 positive going pulses at the frequency of 60 pulses per second, wherein the pulses have a 50% duty cycle and are 180 degrees out of phase with one another, the silicon controlled rectifiers SCR3 and SCR4 will be alternately gated for conduction.

Specifically, assuming that the rectifier SCR3 is conducting by virtue of the application of a positive anode-cathode voltage and a positive gating pulse on the conductor 107, current flows in a path from the direct current source 17 via the conductor 118a, winding 111 of the transformer T6, winding 116 of the transformer T7, the anode-cathode of the rectifier SCR3 and the limiting inductor L104 to the conductor 118b. By virtue of the transformer action between the windings of the transformers T6 and T7, the voltage at the anode of the rectifier SCR4 will be approximately twice that voltage E of the direct current source 17. This condition of conduction persists for as long as no voltage reversal has taken place across the rectifier SCR3. Therefore, the subsequent removal of the positive going pulse from the conductor 107 does not render the rectifier SCR3 non-conductive. However, whenever the positive going pulse is removed from the conductor 107, a positive going pulse is applied to the conductor 108. Thereupon the rectifier SCR4 is fired for conduction and momentarily at least the cathode of the rectifier SCR3 has applied thereto a voltage of nearly 2E so that the rectifier SCR3 is back biased. The discharge time constant for the inductor L104 and the capacitor C103 combination is chosen so that the rectifier SCR3 is maintained back biased for an interval sufficient to make certain that the rectifier is turned off.

Although the rectifier SCR3 is back biased, it is not rendered non-conductive until the reactive load current flow through SCR3 is interrupted. The reactive load current continues a diminishing feedback flow through the windings 110, 111, 115 and 116, the rectifier SCR3, and the feedback diode D16 via the conductor 118a into the battery 17 until the load current reverses. During this feedback interval, the current through the conductive rectifier SCR4 falls to zero. However, as the load current reverses, the rectifier SCR4 is refired by the continuous gate signal on conductor 108 to complete a conductive path from battery at conductor 118a through the windings 115 and 110, the rectifier SCR4, inductance L104 and conductor 118b to battery. Conduction continues uninterrupted through rectifier SCR4 until the time at which the positive signal on conductor 108 is removed and a positive signal is applied to conductor 107. At that time rectifier SCR3 is fired and rectifier SCR4 is back biased. However, SCR3 is non-conductive and SCR4 remains conductive for the feedback interval and until the reactive load current flow through windings 110, 111, 115 and 116, rectifier SCR4, the feedback diode D15 and into the battery 17 via conductor 118a is overcome. Thereupon the rectifier SCR4 is turned off and the rectifier SCR3 is rendered full conductive supporting a flow of current therethrough.

This reversal of current flows in the windings of the transformers T6 and T7 develops in the secondary winding 112 of the transformer T6 an alternating voltage of a 60 cycle frequency. This secondary winding 112 of the transformer T6 operates as a coupling device between the inverter circuit 18 and the regulator circuit 16 for the transfer of power. The operation of the regulator circuit 16, in utilizing the power furnished to it from the inverter circuit 18, and in furnishing power to the inverter circuit 18, and in regulating the power supplied to the load 12 will be better understood by reference to the following section.

*The regulator circuit*

Figure 5:
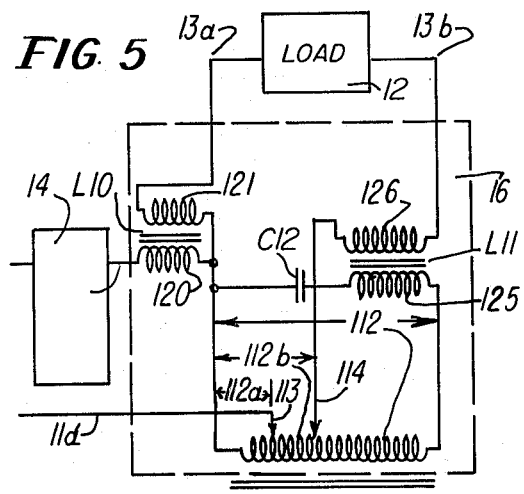
FIGURE 5 is a schematic representation of that portion of the regulator circuit shown in FIGURE 2 as seen by the line power source.
Figure 6:
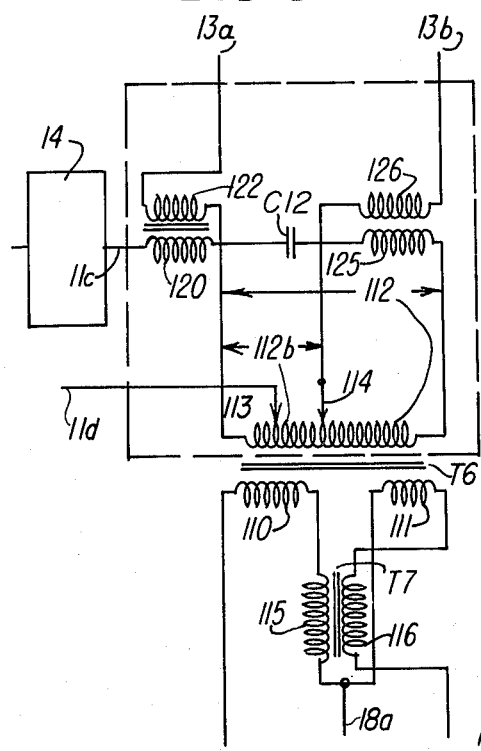
FIGURE 6 is a schematic representation of that portion of the regulator circuit shown in FIGURE 2 as seen by the inverter circuit; and, FIGURES 7A and 7B are wave forms illustrating operation of the inverter circuit.

The construction and operation of the regulator circuit 16 will be understood by reference to the FIGURES 2, 5 and 6. By reference to the FIGURE 2, the regulator circuit 16 is seen to include the winding 112 of the transformer T6, an inductor L10, an inductor L11 and a capacitor C12. The inductor L10 is a linear inductor including a main winding 120 and an auxiliary winding 121 both of which are wound on a common core. The inductor L11 is of a hybrid type including a winding 125 and a winding 126 for which the winding 125 is common to a pair of cores and the winding 126 is wound on one of the cores common to the winding 125. The winding 112 of the transformer T6 is on a core common to the windings 110 and 111 and includes thereon a tap 113 and a tap 114. Accordingly, the winding 112 may be utilized as an auto transformer, wherein the total winding 112 constitutes one output winding, a sub-winding 112a as defined by the tap 113 constitutes the input winding, and a further sub-winding 112b defined by the tap 114 constitutes a selected output for the input sub-winding 112a. Taps 113 and 114 are adjusted on the winding 112 to provide for best regulation and harmonic content in the output.

In the circuit configuration of FIGURE 2, the linear inductor L10 serves a multiple purpose, in the one instance to provide good load regulation when power is being fed to the regulator circuit from the alternating current power line conductors 11c and 11d, and in the other instance, to maintain a current limiting impedance in series with the load circuit 12 so that if the load 12 should be short circuited, the regulator circuit would not be damaged. The capacitor C12 and the inductance winding 125 in conjunction with the winding 112 constitute a ferro-resonant circuit combined to provide a good power factor characteristic with respect to the line. Additionally, the capacitor C12 and winding 125 operate as a filter and rate of change limiter thereby to provide an approximate sinusoidal wave shape to the output presented to the load circuit 12. The winding 126 of the inductance L11 reintroduces into the system some of the harmonics developed in the winding 125 and acts in a nature similar to negative feedback to cancel out unwanted harmonics and to further shape the output wave presented to the load 12 as a true sine wave. These operational modes will be understood by reference to the FIGURES 5 and 6. The FIGURE 5 illustrates the regulator circuit 16 when power is provided from the alternating current power line over conductors 11c and 11d. The FIGURE 6 illustrates the regulator circuit 16 under the circumstances where it is provided power from the inverter circuit 18.

Referring first to the FIGURE 5 and assuming that alternating current power is supplied to the conductors 11c and 11d at a frequency of 60 cycles per second and at an amplitude of 120 volts, a circuit is completed via the conductor 11c through the winding 120 and the sub-winding 112a to the conductor 11d. The output circuit looking to the load terminals 13a and 13b includes the winding 121 of the inductor L10, the sub-winding 112b of the transformer T6, and the winding 126 of the inductor L11. In the circuit arrangement the output across the terminals 13a and 13b appears as a true sine wave. The windings 120 and 121 do not contribute substantially to the output voltage except in the condition of a line voltage fluctuation on the conductors 11c and 11d, in which circumstance both the windings 120 and 121 cooperate to dampen any fluctuation and prevent its appearance on the output terminals 13a and 13b.

The capacitor C12 in the ferro-resonant circuit including the winding 112 and the winding 125 operates in this system on the instantaneous voltage to achieve regulation by causing an abrupt change in the regulator network between a capacitive reactance and an inductive reactance at the saturation amplitude of transformer T6 and thereby changes the voltage developed in the inductor L10 which is added to or subtracted from the output voltage.

Figure 7A:
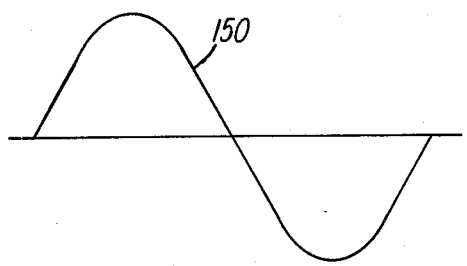
Figure 7B:
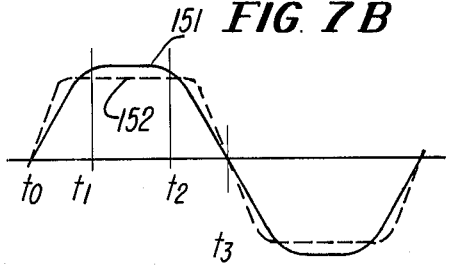

Specifically, and in giving consideration to the FIGURES 7A and 7B, there is shown in FIGURE 7A a sine wave input 150 such as would normally appear on the conductors 11c and 11d. Referring to FIGURE 7B, and assuming that a sine wave cycle begins at a time at $t0$ the transformer T6 will saturate at an amplitude occurring at a time $t1$ as shown by the solid line 151. Between the time interval $t0$ and $t1$, the capacitor C12 is drawing a current that is leading the line current and so it produces in the inductor L10 a small voltage that vectorally adds to the line voltage as illustrated by the dashed curve 152. However, at the time $t1$ and until the transformer unsaturates at the time $t2$, the circuit is essentially an inductive reactance with current lagging the line current and generating in the primary winding 120 of the inductor L10 a voltage which lags line voltage and vectorally subtracts from the line voltage as shown by the curve 152. This action is further emphasized and rendered more effective by virtue of the inclusion of the secondary winding 121 of the inductor L10 in the circuit. Assuming that the input to the conductors 11c and 11d is fairly well regulated, the inductor L10 does modify the output voltage in the manner as indicated. But more importantly, should the line voltage on the conductors 11c and 11d suddenly increase, the transformer T6 saturates earlier thereby causing a switch-over from the capacitive to the inductive reactance at an earlier instant whereby the inductor L10 makes an instantaneous subtraction from the output voltage appearing at the terminals 13a and 13b. Accordingly, the increase in line voltage is compensated for within the regulation circuit 16 and does not appear at the output terminals 13a and 13b.

Within the ferro-resonant circuit the winding 125 of the inductor L11 in conjunction with the capacitor C12, operates as a low pass filter thereby acting as a rate of change limiter. If this rate of change is limited by design of the LC network so as to establish a cut-off characteristic somewhere between the fundamental (60 cycles) and the second harmonic (120 cycles) the rate of change in the output voltage cannot be faster than 60 cycles per second. This inclusion of the inductor 125 gives a substantial sinusoidal wave shape to the voltage appearing across the sub-winding 112b and further shaping of the wave is effected by including in the output circuit the winding 126 of the inductor L11 connected into the circuit so as to provide an effective negative feedback function. In the arrangement of FIGURE 5 the whole of the winding 112 of the transformer T6 is employed for purposes of the ferro-resonant circuit only out of consideration of the fact that less expensive capacitors can be utilized at this higher voltage.

The effective arrangement of the regulator circuit 16 in the circumstance where power is supplied from the inverter circuit 18 is illustrated in FIGURE 6. The output from the inverter circuit 18 is an alternating current of a substantially square wave form having a frequency of 60 cycles. Therefore, the function of the regulator circuit 16 is to change the square wave form to a sine wave form and to regulate the amplitude of that wave for application to the output terminals 13a and 13b. This is accomplished essentially through use of the ferro-resonant circuit including the winding 112, the capacitor C12 and the winding 125 of the inductor L11 and thereby to provide across the sub-winding 112b a modified sine wave form voltage. The sine wave form is further shaped by means of the winding 126 of the inductor L11 which feeds harmonic components in phase opposition to the unwanted harmonic components already in the output wave thereby bucking out these harmonics and providing a true sine wave form of 60 cycle frequency.

The equipment so arranged provides an alternating current power supply capable of automatic instantaneous switch from an A.C. line power supply to a D.C. storage power supply. When supplied from the A.C. line power supply, the system operates so as to maintain the D.C. storage power supply at full charge and when supplied from the D.C. storage power supply, the system is operated to prevent a supply of power to the A.C. line power supply. Further, the system operates to regulate the output to within 3% when supplied from A.C. line power and to within 7% when supplied from D.C. storage power that may vary by as much as 20%. Additionally, the output circuit of the power supply is not damaged by a short circuit across the load in that it contains a series current limiting impedance.

These advantages and features will be better understood from the following description of the operation of the system.

Operation

Considering now the operation of the system as illustrated in FIGURE 1, and assuming that initially the alternating current power line terminals 11a and 11b are disconnected from an alternating current power source, the line voltage sensor circuit 26 will be inoperative so that the time delay circuit 28 and the line isolator gating network 30 and the connective line switch 14 will all be inoperative. In the synchronizing circuit 19 the frequency generator 22 will be free running and the trigger amplifier 24 will be providing positive going triggering pulses at the rate of 60 per second to the inverter circuit 18. In the inverter power circuit 18, the direct current source 17 will be inverted to an alternating current of voltage of 60 cycle frequency which is applied to the regulator circuit 16 and shaped so that when presented to the load 12 at the output terminals 13a and 13b the voltage is on alternating current of a sine wave form of 60 cycles.

Giving specific consideration to FIGURE 4, in the frequency generator 22 the relay K1 is restored so that the unijunction U2 in conjunction with the circuitry associated therewith is a free running oscillator providing positive going triggering pulses via the diode D5 to the bi-stable multivibrator circuit 78 including the transistors TR1 and TR2. In the output conductors 80 and 82 thereof there is generated substantially square wave pulses of a 60 cycle frequency that are 180 degrees out of phase to one another. These pulses are applied to the trigger amplifier 24 including the transistors TR4 and TR5 whereby there is developed across the primary winding 88a of the transformer T3 a substantially square wave of a 60 cycle frequency and of a positive and negative polarity and 50% duty cycle. At the same time, there is developed across the primary winding 89a of the transformer T5 a positive going pulse of a 60 cycle frequency and a 50% duty cycle. The secondary windings 88b and 88c of the transformer T3 cooperate with diodes connected therein to provide at output conductors 107 and 108, respectively, positive going pulses of a 60 cycle frequency and of a 50% duty cycle that are 180 degrees out of phase relative to one another. In the ring modulator, inasmuch as there is no signal applied to the conductor 65a and 65b, the transformer T4 is inactive. Accordingly, the ring modulator circuit 20 is inoperative and no signal appears across the conductors 62a and 62b extending to the frequency generator 22.

In the inverter circuit 18, the positive going pulses appearing on the conductors 107 and 108 alternate in the gate the circuit control rectifiers SCR3 and SCR4 so as to reverse the direction of current flow through the winding 110 and 111 of the transformer T6 at the rate of 60 times per second. Accordingly, there appears across the winding 112 of the regulator circuit 16 an alternating voltage of a 60 cycle frequency. Inasmuch as the signal across the winding 112 is considerably greater than 120 volts, a stepdown voltage is taken across the sub-winding 112b at the center tap 114. The sine wave output is shaped by action of the LC circuit including the capacitor C12 and the winding 125 of the inductor L11 and further by action of the winding 126 of the inductor L11. Accordingly, there appears across the output terminals 13a and 13b of the regulator circuit 16 and alternating current voltage of a 60 cycle frequency, 120 volts and conforming to a substantial sine wave form.

Giving consideration to the operation of the circuit in the circumstance where an alternating current voltage is applied to the input terminals 11a and 11b having the 60 cycle frequency but of an amplitude substantially less than 120 volts, it is apparent that the line voltage sensor circuit 26, the time delay circuit 28, the line isolater gating network 30, and the line switch 14 will be inoperative and any connection between the line terminals 11a and 11b and the regulator circuit 16 will be interrupted. In this circumstance, power to the regulator circuit 16 will be provided from the inverter circuit 18 and the direct current source 17.

In the synchronizing circuit 16, the frequency generator 22 will be operating at a 120 cycle frequency as described above and the trigger amplifier 24 will be generating positive voltages applied by the conductors 107 and 108 to the inverter circuit 18. In addition, the ring modulator 20 will be operative in comparing the phase of the voltage appearing on the secondary winding 89b of the transformer T5 from the trigger amplifier 24 with that of the alternating current voltage appearing on the secondary winding 63b of the transformer T4 from the power line conductors 11c and 11d and producing a difference potential depending upon the difference. This potential applied across the resistor 74 in the frequency generator 22 thereby to adjust the firing time of the unijunction U2 and to bring the two signals into phase at the ring modulator 20. The remainder of the operation of the alternating current power circuit 10 is in accordance with that described above.

From the foregoing it is clear that in the circumstance where an alternating current power line voltage is applied to the input terminals 11a and 11b of an amplitude insufficient to come up to the level of a pull-in voltage of the line voltage sensor circuit 26, the line voltage does serve the function of operating the ring modulator 20 and thereby the frequency generator 22 to synchronize the output of the inverter power circuit and accordingly, the regulator circuit to the phase of the alternating current line power voltage. In this fashion, the power circuit 10 is prepared for return of the alternating current power line voltage to full line voltage level with a minimum of circuit disturbance.

Giving consideration now to the circumstance in which the alternating current voltage applied to the power line terminals 11a and 11b is of a full voltage magnitude of 120 volts. The alternating current power line circuit 10 is operated so that power is provided to the regulator circuit 16 through the line circuit 14, which power is then distributed to the output conductor 13a and 13b and also applied to the inverter circuit 18 for purposes of recharging the direct current source 17. Specifically, in assuming that the alternating current power line voltage is increased from 70 volts to 120 volts, and assuming at that instant that power is provided at the regulator circuit 16 from the inverter circuit 18, immediately the line voltage sensor circuit 26 will be operated to activate the relay K2 and close contacts K2-1 thereby providing a charging potential to the time delay circuit 28 and an operating voltage to the relay K1 and the frequency generator 22. After a time delay corresponding to the selected magnitudes of the variable resistor 54 and the charging capacitor 56 in the time delay circuit 28, the operating emitter potential of the unijunction U1 will be reached so that the unijunction will be rendered conductive and operate the relay K3 for purposes of closing the contacts K3-1, K3-2 and K3-3. The closer of the contacts K3-1 in the time delay circuit 28 completes a shunt circuit including the variable resistor 46 across the winding of the relay K2 thereby setting the dropout voltage of the relay and contacts K3-2 completes the circuit from maintaining the relay K3 operated via the contacts K2-1. Closure of the contacts K3-3 completes a circuit for operating the line isolator gating network 30 in a manner as is described hereinafter.

During the interval that the time delay circuit 28 is being charged at the capacitor 56 and before the unijunction U1 is rendered conductive and the relay K3 operated, the frequency generator 32 in the synchronizing circuit 19 is controlled to adjust the phase of its output and the output of the trigger amplifier 24 and the inverter circuit 18 relative to that of voltage on the power line conductors 11c and 11d. Specifically, closure of the relay K2 in the line voltage sensor circuit 26 operates the relay K1 in the frequency generator 22 thereby to close the contacts K1-1 and to provide an alternate charge path for the capacitor 71 via the resistor 77, the contacts K1-1 and the variable resistor 78. The variable resistor 78 is adjusted as a voltage divider between the negative and positive battery sources to retard the charging of the capacitor 71 and thereby cause the unijunction U2 to fire at a later time.

Assuming that the unijunction U2 was being fired in synchronism with the alternating current voltage on the power line conductors 11c and 11d, this delay in firing actually has the effect of causing the output from the inverter circuit 18 to lag in phase the voltage appearing on the alternating current power line conductors 11c and 11d. This lag in phase is detected in the ring modulator 20 which attempts to adjust the bias on the B2 contact of the unijunction U2 so as to bring the signals back into phase. But the compromise of this situation is to cause the unijunction U2 to be fired at a 60 cycle frequency and at a phase approximately 10 degrees lagging that of the phase of the alternating current voltage on the power line conductors 11c and 11d.

The amount of phase error is regulated by adjustment of the variable resistor 78, it being possible thereby to change the phase relationship between voltages over a substantial number of degrees both leading and lagging. This adjustment in phase introduces the same adjustment in the output of the triggering amplifier and the output of the inverter circuit so that in the preferred circumstance of the phase of the alternating current voltage provided by the inverter circuit 18 is 10 degrees lagging with respect to that of the alternating current voltage on the line conductors 11c and 11d. Thus, during the interval that the time delay circuit is charging, the synchronizing circuit 19 is adjusted to phase the output of the inverter circuit 18 to 10 degrees lagging that of the alternating current line conductors 11c and 11d. Thereafter, the relay K3 is operated and the line isolator gating network and the line switch 14 are also operated to apply the alternating current line voltage on the conductors 11c and 11d to the regulator circuit 16.

Specifically, closure of the contacts K3-3 in the time delay circuit 28 completes a circuit by the primary winding 36 of the transformer T1 in the line isolator gating network 30 and across the line conductors 11c and 11d, thereby to present to the secondary windings 31 and 38 voltages of opposite phase. The voltage across the secondary winding 31 is rectified by means of the diode D2 and applied to the gate terminal of the silicon controlled rectifier SCR1 in the line switch 14. This gating pulse is in synchronism with the positive going half cycle of the 60 cycle voltage on the line conductors 11c and 11d whereby that positive half cycle is transmitted through the SCR1 to the voltage regulator 16. During the next or negative half cycle the secondary winding 38 of the transformer T1 in the line isolating gating network 30 is rectified by action of the diode D1 and applied to the gating terminal of the silicon controlled rectifier SCR2 in the line switch 14, whereby the negative half cycle of each 60 cycle wave on the line conductors 11c and 11d is transmitted to the regulator circuit 16. At this time then the regulator circuit 16 is being supplied power from both the line conductors 11c and from the inverter circuit 18. However, at this instant the regulator circuit is drawing power only from the line conductors 11c and 11d in a manner as is explained hereinafter.

Turning now to FIGURE 2, in the regulator circuit 16 the alternating current voltage on the line conductors 11c and 11d is applied via the winding 120 of the linear inductor 120 and via the sub-winding 112a of the winding 112 of the transformer T6 to the tap 113 thereby energizing the core of the transformer T6 in a phase leading that energization provided thereto via the windings 110 and 111 of the inverter circuit 18. Accordingly, the work of energizing the core of the transformer T6 is accomplished by the power provided from the line conductors 11c and 11d. Further, as the flux provided by the voltage on the line conductors 11c and 11d during the 10 degrees leading phase portion of the signal is bucking the flux intended to be generated by the inverter circuit during that interval, a back E.M.F. is generated in the windings 110 and 111 of the transformer T6 during that interval thereby unloading the direct current source 17 at the input conductor 118a and opening the appropriate one of the diodes D15 and D16 so as to charge the direct current source 17 through the conductor 118b.

Within the regulator circuit 16 the alternating current voltage on the conductors 11c and 11d drives the core of the transformer T6 to a saturation well in advance of the peak voltage of 120 volts. However, operation of the linear inductor L10 at the windings 120 and 121 in conjunction with the resonant circuit formed by the winding 112, the winding 125 and the capacitor C12 operate to regulate the output voltage appearing at the terminals 13a and 13b against any fluctuations in the line voltage on the conductors 11c and 11d. Conjointly the filtering action of the capacitor C12 and winding 125 operates to shape the output wave in the sinusoidal form and the winding 126 of the inductor L11 operates further to buck out harmonic fluctuations in the signal so as to reduce the output at the terminals 13a and 13b to a regulated alternating current voltage of a 60 cycle frequency and of an amplitude of 120 volts and of a substantial sine wave form.

If thereafter the voltage on the line conductors 11c and 11d should be completely interrupted or fall off below the level of the dropout voltage established in the line voltage sensor circuit 26, the relay K2 therein will immediately restore thereby opening contacts K2–1 causing the restoration of the relay K1 in the frequency generator 22 and the relay K3 in the time delay circuit 28. Accordingly, the gating pulses supplied to the line switch 14 from the line isolator gating network 30 are interrupted so that the line switch 14 is opened and the voltage, if any, on the line conductors 11c and 11d is interrupted from application to the regulator circuit 16. At the same time the opening of the relay K1 in the frequency generator 22 removes the phase shifting bias from the frequency generator so that the unijunction U2 therein tends to fire at an earlier time substantially in phase with the alternating current voltage wave form last available on the line conductors 11c and 11d. Accordingly, the phase of the alternating current voltage in the circuit 18 will tend to change accordingly and power in the regulator circuit 16 will be drawn now from the inverter circuit. Accordingly, the regulator circuit will provide an output voltage at its output terminals 13a and 13b substantially instantaneously upon the fault of the voltage on the line conductors 11c and 11d. This voltage appearing at the output terminals 13a and 13b will be of a 60 cycle frequency, of a sine wave form and of 120 volts. To the load 12 the only indication of switching between supply from the line conductors 11c and 11d and the inverter circuit 18 is a slight discontinuity in the alternating current voltage wave form reflecting the phase difference between the two circuits.

In the preferred arrangement of the present invention, the alternating current power circuit is designed to operate with an alternating current power input from 100 to 130 volts at 60 cycles or with a direct current source in the range of 22 to 28 volts. The provided output is an alternating current sine wave form having a maximum amplitude of 120 volts at 60 cycles regulated to within the plus or minus 3% when power is drawn from the alternating current power source having a 30% variation in voltage and regulated to within plus or minus 7% when power is drawn from the direct current source having a 30% variation in voltage. Switch-over is achieved instantaneously with a transient excursion at the output conductors of less than 10% of peak voltage and of a duration of but 1 cycle. The frequency stability of the circuit when operated from the direct current source is plus or minus 0.2%.

In view of the foregoing, it is obvious that there has been provided herein a new and improved alternating current power circuit having the substantial advantage of a solid state circuitry, thereby contributing to its reliability and providing an instantaneous switch-over in load current from the alternating current line to the direct current source with a transient excursion of not more than 1 cycle.

The arrangements described herein are believed to be preferred. However, it is understood that variations and modifications may be made therein without departing from the basic principles of the invention, and it is intended to cover in the appended claims all such variations and modifications as lie within the true spirit and scope of the invention.

What is claimed is:

1. An alternating current power distribution circuit comprising a voltage regulator for furnishing alternating current power to a load, means for connecting a source of alternating current line power to said voltage regulator, an inverter circuit for converting direct current power to alternating current power and furnishing said power to said voltage regulator, synchronizing means associated with said inverter circuit for furnishing said alternating current power to said voltage regulator in lagging phase relationship to said alternating current line power, whereby the alternating current power furnished to said load is drawn substantially entirely from said source of alternating current line power.

2. An alternating current power distribution circuit comprising a voltage regulator for furnishing alternating current power to a load, means for connecting a source of alternating current line power greater than a predetermined voltage to said voltage regulator, an inverter circuit for converting direct current power to alternating current power and furnishing said power to said voltage regulator, and synchronizing means associated with said inverter circuit for furnishing said alternating current power to said voltage regulator in lagging phase relationship to said alternating current line power, whereby the alternating current power furnished to said load is drawn from said source of alternating current line power when the voltage is greater than said predetermined voltage and is drawn from said inverter circuit when the alternating current line voltage is less than said predetermined voltage.

3. An alternating current power distribution circuit comprising a voltage regulator for furnishing alternating current power to a load, means including a line switch for connecting a source of alternating current line power to said voltage regulator responsive to the voltage thereof being greater than a predetermined voltage and for disconnecting said source of alternating current line power from said voltage regulator responsive to the voltage thereof being less than said predetermined voltage, an inverter circuit for converting direct current power to alternating current power and furnishing said power to said voltage regulator, and synchronizing means associated with said inverter circuit for furnishing said alternating current power to said voltage regulator in lagging phase relationship to said alternating current line power, whereby the alternating current power furnished to said load is drawn from said source of alternating current line power when the voltage is greater than said predetermined voltage and is drawn from said inverter circuit when said alternating current voltage is less than said predetermined voltage.

4. An alternating current power distribution circuit comprising a voltage regulator for furnishing alternating current power to a load, means for connecting a source of alternating current line power greater than a predetermined voltage to said voltage regulator, an inverter circuit for converting direct current power to alternating current power and furnishing said power to said regulator circuit, and synchronizing means associated with said inverter circuit for furnishing said alternating current power to said voltage regulator in lagging phase relationship to said alternating current line power, said synchronizing means including a generator producing signals at line frequency and a phase detector for matching the phase of said signals to that of said alternating current line power source thereby to adjust the operational phase of said generator, whereby the alternating current power furnished to said load is drawn from said source of alternating current line power when the voltage is greater than said predetermined voltage and is drawn from said inverter circuit when the alternating current voltage is less than said predetermined voltage.

5. An alternating current power distribution circuit comprising a voltage regulator for furnishing alternating current power to a load, means for connecting a source of alternating current line power greater than a predetermined voltage to said voltage regulator, and inverter circuit for converting direct current power to alternating current power and furnishing said power to said voltage regulator, and synchronizing means associated with said inverter circuit for furnishing said alternating current power to said voltage regulator in lagging phase relationship to said alternating current line power, said synchronizing means including a free running oscillator and trigger amplifier in series for producing timing signals at line frequency for said inverter circuit and including a ring modulator matching the phase of said timing signals to that of said source of alternating current line power and providing a corresponding correction signal to said free running oscillator, whereby the alternating current power furnished to said load is drawn from said course of alternating current line power when the voltage is greater than said predetermined voltage and is drawn from said inverter circuit when the alternating current voltage is less than said predetermined voltage.

6. An alternating current power distribution circuit comprising a voltage regulator for furnishing alternating current power to a load, a switching circuit for connecting a source of alternating current line power to said voltage regulator responsive to the voltage thereof being greater than a predetermined voltage and for disconnecting said source of alternating current line power from said voltage regulator responsive to the voltage thereof being less than said predetermined voltage, said switching circuit including a line switch selectively gated for applying alternating current power to said regulator circuit and a line voltage sensor rendered operative responsive to a predetermined voltage from said source of alternating current line power and a gating circuit operative from said line voltage sensor a predetermined interval after operation of said line voltage sensor for providing gating signals to said line switch, an inverter circuit for converting direct current power to alternating current power and furnishing said power to said voltage regulator, and synchronizing means associated with said inverter circuit for furnishing said alternating current power to said voltage regulator in lagging phase relationship to said alternating current line power, whereby the alternating current power furnished to said load is drawn from said source of alternating current line power when the voltage is greater than said predetermined voltage and is drawn from said inverter circuit when the alternating current voltage is less than said predetermined voltage.

7. An alternating current power distribution circuit comprising a voltage regulator for furnishing alternating current power to a load, a switching circuit for connecting a source of alternating current line power to said voltage regulator responsive to the voltage thereof being greater than a predetermined voltage and for disconnecting said source of alternating current line power from said voltage regulator responsive to the voltage thereof being less than said predetermined voltage, said switching circuit including a line switch selectively gated for applying alternating current power to said regulator circuit and a line voltage sensor rendered operative responsive to a predetermined voltage from said source of alternating current line power and a gating circuit operative from said line voltage sensor a predetermined interval after operation of said line voltage sensor for providing gating signals to said line switch, an inverter circuit for converting direct current power to alternating current power and furnishing said power to said regulator circuit, synchronizing means associated with said inverter circuit for furnishing said alternating current power to said voltage regulator in fixed phase relationship to said alternating current line power, said synchronizing means including a free running oscillator and trigger amplifier in series for producing timing signals for said inverter circuit and including a ring modulator matching the phase of said timing signals to that of said source of alternating current line power and providing a corresponding correction signal to said free running oscillator, a biasing circuit associated with said free running oscillator operative in conjunction with said ring modulator and responsive to the operation of said line voltage sensor for shifting the phase of the timing signals furnished by said trigger amplifier to lagging the phase of said source of alternating current line power whereby the alternating current power furnished to said load is drawn from said source of alternating current line power when the voltage is greater than said predetermined voltage and is drawn from said inverter circuit when said alternating current voltage is less than said predetermined voltage.

8. A regulator circuit for providing a regulated sine wave form alternating current voltage to an output load comprising a pair of input terminals, a pair of output terminals, means for supplying said input terminals from a source of variable alternating current voltage, a linear inductor, a saturable reactor, a capacitive reactance across said saturable reactor forming a ferro-resonant circuit therewith, an input circuit between said pair of input terminals and including said linear inductor and a first portion of said saturable reactor for limiting the amplitude of the alternating current voltage provided at said input terminals, a choke coil in series with said capacitive reactance for filtering from said ferro-resonant circuit frequencies above the alternating current frequency, whereby the wave form in said saturable reactor is shaped to be substantially a sine wave form, a feedback inductance magnetically coupled to said choke coil and an output circuit between said output terminals and including at least said first portion of said saturable reactor and said feedback inductance for providing a regulated true sine wave form output voltage.

9. A regulator circuit for providing a regulated sine wave form alternating current voltage to an output load comprising a first pair of input terminals adapted to be supplied from a first source of alternating current voltage, a second pair of input terminals adapted to be supplied from a second source of alternating current voltage, and a pair of output terminals, a linear inductor, a saturable reactor, a capacitive reactance across said saturable reactor forming a ferro-resonant circuit therewith, a first circuit between said first pair of input terminals and including said linear inductor and saturable reactor for limiting the amplitude of the voltage provided said first source of alternating current voltage, a second circuit between said second pair of input terminals and including said saturable reactor, a choke coil in series with said capacitive reactance for filtering from said ferro-resonant circuit frequencies above the alternating current frequencies, and an output circuit between said pair of output terminals and including said saturable reactor whereby the voltage in the output circuit is substantially of a sine wave form at the alternating current frequency and of a regulated amplitude.

10. A regulator circuit for providing a regulated sine wave form alternating current voltage to an output load comprising a first pair of input terminals adapted to be supplied from a source of alternating current line power voltage of sine wave form, a second pair of input terminals adapted to be supplied from a source of alternating current voltage of square wave form, a pair of output terminals, a linear inductor including a primary winding and a secondary winding, a saturable reactor including an output winding and a control winding, a first circuit between said first pair of input terminals and including said primary winding and a first portion of said output winding for limiting the amplitude of said line power voltage, a second circuit between said second pair of input terminals and including said control winding of the saturable reactor, an inductive reactance including a primary winding and a secondary winding, a capacitive reactance connected in series with the primary winding of said inductive reactance across the output winding of said saturable reactor forming a filtering ferro-resonant circuit for regulating the amplitude of the output voltage and for filtering from the output voltage wave form frequencies above the alternating current frequencies, and an output circuit between said output terminals and including the secondary winding of said inductive reactance and at least said first portion of the output winding of said saturable reactor, said secondary winding of said inductive reactance being arranged to buck out of the output voltage wave form any frequencies therein above said alternating current frequency, whereby the voltage in the output circuit is substantially of a sine wave form at the alternating current frequency and of a regulated amplitude.

11. In combination an inverter circuit and regulator circuit for providing a regulated sine wave form voltage from a direct current power source; said inverter circuit comprising a pair of parallel controlled rectifiers each including an anode and a cathode and a control electrode, a commutating capacitor connected between the anodes of said rectifiers, an inductive reactance load circuit connected across said commutating capacitor, means for applying a direct current voltage source to said inductive reactance load and across said controlled rectifiers to provide a positive anode to cathode voltage, and means for alternately gating said controlled rectifiers at the control electrodes thereof whereby an alternating current signal of a substantially square wave form is generated in said inductive reactance load circuit; said regulator circuit comprising a pair of input terminals, a pair of output terminals, means for supplying said input terminals from a source of variable alternating current voltage, a saturable reactor, said saturable reactor including an output winding, said inductive reactance load of said inverter circuit forming a portion of said saturable reactor so that the alternating current signal generated therein is supplied to said regulator circuit, a capacitive reactance across said output winding of said saturable reactor for forming a ferro-resonant circuit having a frequenecy at said alternating current frequency, a choke coil in series with said capacitive reactance for filtering from said ferro-resonant circuit frequencies above the alternating current frequency; whereby the inverter circuit converts the direct current voltage to an alternating current voltage of the square wave form and the regulator circuit shapes the voltage to an alternating current of sine wave form.

12. A synchronizing circuit arrangement adapted to provide signals at a frequency equal to that of a standard and at a fixed phase relative to said standard comprising a free running oscillator including a break down type electron flow device provided with a fixed biasing circuit and a charging circuit selectively operative in a first charging condition and in a second charging condition, said oscillator being normally in said first charging condition for producing signals corresponding in frequency to that of said standard and being selectively operable into said second charging condition for producing signals of a frequency different from that of said standard, a detector for matching the phase of the signals produced by said oscillator to the phase of said standard and for producing an error signal corresponding to the phase difference, means for applying said error signal to the fixed biasing circuit of said free running oscillator to render the phase of the output signals coincident with that of said standard, and means for operating said oscillator into said second charging condition thereby tending to make the frequency of said oscillator different from that of said standard, whereby said oscillator is biased in composite to provide output pulses at the frequency of the standard and at a fixed phase difference therefrom.

13. An alternating current power distribution circuit which comprises a regulator circuit for furnishing alternating current power to a load; said regulator circuit including a pair of input terminals, a pair of output terminals, a linear inductor, a saturable reactor, a capacitive reactance across said saturable reactor forming a ferro-resonant circuit therewith, an input circuit between said pair of input terminals and including said linear inductor and a first portion of said saturable reactor for limiting the amplitude of the alternating current voltage provided at said input terminals, a choke coil in series with said capacitive reactance for filtering from said ferro-resonant circuit frequencies above the alternating current frequency, whereby the wave form in said saturable reactor is shaped to be substantially a sine wave form, and an output circuit between said output terminal including at least said first portion of said saturable reactor for providing a regulated sine wave form voltage; a line switch for selectively connecting a pair of conductors carrying alternating current power from a source to the input terminals of said regulator, said line switch including a parallel pair of oppositely poled controlled rectifiers disposed in a loop circuit between said power conductors, each of said controlled rectifiers including an anode and a cathode and a control electrode wherein the anode to cathode potentials at said pair of rectifiers are alternately positive and negative in accordance to the alternating current power polarities; means for applying positive gating pulses alternately to the control electrodes of said pair of controlled rectifiers in synchronism with positive anode to cathode potentials thereon whereby the alternating current power source is isolated from the regulating circuit upon failure of the power source and also upon failure of the means for applying positive gating pulses to the controlled rectifiers; a line voltage sensor rendered operative responsive to a predetermined voltage from said source of alternating current for rendering said gating pulse applying means effective, an inverter circuit for converting direct current power to alternating current power and furnishing said power to the input terminals of said regulator circuit, and a synchronizing circuit associated with said inverter circuit for furnishing said alternating current power to said voltage regulator in lagging phase relationship to said alternating current line power; said synchronizing circuit including a free running oscillator having a breakdown type electron flow device provided with a biasing circuit normally producing signals corresponding in frequency to the frequency of the signal supplied from said source, a detector for matching the phase of the signals produced by said oscillator to the phase of the signal supplied from said source and for producing an error signal corresponding to the phase difference, and means for applying said error signal to the biasing circuit of said free running oscillator to correct said phase difference.

References Cited by the Examiner
UNITED STATES PATENTS

| | | | |
|---|---|---|---|
| 1,951,482 | 3/1934 | Holden | 307—64 |
| 1,953,973 | 4/1934 | Page | 331—25 |
| 2,005,153 | 6/1935 | Marks | 331—25 |
| 2,748,337 | 5/1956 | Sechrist et al. | 321—16 |
| 2,759,139 | 8/1956 | Few et al. | 321—16 |
| 2,796,536 | 6/1957 | Davis | 307—64 |
| 2,777,955 | 1/1957 | Gabor | 331—25 X |
| 2,868,996 | 1/1959 | McCord | 307—64 |
| 2,920,240 | 1/1960 | Macklem | 307—88.5 |
| 2,941,141 | 6/1960 | Hughes | 323—89.18 |
| 3,021,431 | 2/1962 | Wellman | 307—88.5 |
| 3,041,528 | 6/1962 | Alizon | 323—89.18 |
| 3,058,010 | 10/1962 | Rockafellow | 307—88.5 |
| 3,135,894 | 6/1964 | Oglesbee | 323—89 |

LLOYD McCOLLUM, Primary Examiner.

L. R. CASSETT, T. J. MADDEN, Assistant Examiners.

UNITED STATES PATENT OFFICE
CERTIFICATE OF CORRECTION

Patent No. 3,229,111                 January 11, 1966

Rudolf Schumacher et al.

It is hereby certified that error appears in the above numbered patent requiring correction and that the said Letters Patent should read as corrected below.

Column 8, line 11, for "The trigger amplifier 24 includes essentially a con-" read -- The bi-stable multivibrator circuit 78 including the --; line 22, for "25" read -- 24 --.

Signed and sealed this 10th day of January 1967.

(SEAL)
Attest:

ERNEST W. SWIDER
Attesting Officer

EDWARD J. BRENNER
Commissioner of Patents